(12) United States Patent
Kunihara et al.

(10) Patent No.: US 9,530,236 B2
(45) Date of Patent: Dec. 27, 2016

(54) TIME CODE DISPLAY DEVICE AND TIME CODE DISPLAY METHOD

(71) Applicant: Sony Corporation, Tokyo (JP)

(72) Inventors: Shinji Kunihara, Kanagawa (JP); Yasuyuki Uemura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 666 days.

(21) Appl. No.: 13/716,747

(22) Filed: Dec. 17, 2012

(65) Prior Publication Data

US 2013/0162638 A1 Jun. 27, 2013

(30) Foreign Application Priority Data

Dec. 22, 2011 (JP) .................................. 2011-281056

(51) Int. Cl.
  *G06T 15/00* (2011.01)
  *H04N 13/00* (2006.01)
  *H04N 13/04* (2006.01)

(52) U.S. Cl.
  CPC ........... *G06T 15/00* (2013.01); *H04N 13/0048* (2013.01); *H04N 13/0055* (2013.01); *H04N 13/0497* (2013.01)

(58) Field of Classification Search
  CPC ............................ G06T 15/00; H04N 13/0048
  USPC ....................................................... 345/419
  See application file for complete search history.

(56) References Cited

U.S. PATENT DOCUMENTS

| | | | | |
|---|---|---|---|---|
| 4,858,027 A | * | 8/1989 | Sashou | G11B 27/028 360/26 |
| 5,091,899 A | * | 2/1992 | Adachi | G11B 27/02 369/83 |
| 7,362,947 B2 | * | 4/2008 | Adachi | G11B 27/034 348/E5.051 |
| 7,877,706 B2 | * | 1/2011 | Albertson | G06F 3/017 715/863 |
| 8,294,754 B2 | * | 10/2012 | Jung | H04N 13/0066 348/43 |
| 8,497,858 B2 | * | 7/2013 | Jung | H04N 13/004 345/419 |
| 8,654,181 B2 | * | 2/2014 | Cornog | H04N 13/0022 348/47 |

(Continued)

FOREIGN PATENT DOCUMENTS

JP 6-32481 4/1994

*Primary Examiner* — William C Vaughn, Jr.
*Assistant Examiner* — Luis Perez Fuentes
(74) *Attorney, Agent, or Firm* — Frommer Lawrence & Haug LLP; William S. Frommer

(57) ABSTRACT

A time code display device includes a time code extraction unit that extracts a left image time code from a left image signal that constitutes a stereoscopic image and a right image time code from a right image signal that constitutes the stereoscopic image; a time code comparison unit that compares the left image time code with the right image time code and outputs a comparison result including information on agreement or disagreement between the left and right image time codes; and a display determination unit that determines to display the left and right image time codes in the same manner when the comparison result indicates agreement therebetween, determines to display the left and right image time codes in different manners when the comparison result indicates disagreement therebetween, and displays the left and right image time codes on a display unit.

5 Claims, 6 Drawing Sheets

(56) References Cited

U.S. PATENT DOCUMENTS

| | | | |
|---|---|---|---|
| 8,655,152 B2 * | 2/2014 | Marks | H04N 5/93 386/278 |
| 2004/0239763 A1 * | 12/2004 | Notea | H04N 5/222 348/169 |
| 2010/0111489 A1 * | 5/2010 | Presler | H04N 5/225 386/278 |

* cited by examiner

TIME CODE DISPLAY DEVICE AND TIME CODE DISPLAY METHOD

BACKGROUND

The present disclosure relates to a time code display device and a time code display method that are used to display time codes added to image signals of a left image and a right image that constitute a stereoscopic image.

In one related art, there is a technique in which a stereoscopic image that a user can view stereoscopically is generated by using images of the same object captured by two cameras set in accordance with a binocular parallax of the user. The images captured by the two cameras are called "left image" for a left eye and "right image" for a right eye (hereinafter, "left image and right image" are referred to as "left and right images").

Examples of a display device with which the user can view a stereoscopic image include a 3D display and a projector that projects an image on a screen. Such display devices alternately display left and right images in a time-division manner on the display surfaces thereof and are used in combination with a pair of shutter glasses having left and right lenses that employ a liquid-crystal shutter. When a stereoscopic image is captured, a left image time code is added to a left image signal and a right image time code is added to a right image signal (hereinafter, "left image time code and right image time code" are referred to as "time codes of left and right images").

Time code (may be abbreviated as TC in the drawings) is a value to be added together with a recording time for every frame of an image. When a video is edited in a broadcasting station or the like, time codes of left and right images are displayed on a professional-use monitor and, for example, reproduction timings of the left and right images are adjusted. Thus, in one related art, such a technique for displaying time codes on left and right images is available.

Japanese Examined Patent Application Publication No. 6-32481 discloses an editing device that sets time codes of the same time on left and right images, stores field data of the left and right images, and outputs a stereoscopic image obtained from both the images of the same time.

SUMMARY

In recent years, a left image signal and a right image signal may each be transmitted to a monitor via a separate cable using a dual link scheme or the like. Hence, either a left image time code or a right image time code is displayed on the monitor; however, it is difficult for a user to know whether the time codes of the left and right images are in agreement or disagreement with each other.

Even when the time codes of the left and right images are simultaneously displayed, it is difficult for the user to visually recognize a difference in a frame in real time. Additionally, in the technique disclosed in Japanese Examined Patent Application Publication No. 6-32481, image signals of the left and right images, with the time codes synchronized beforehand, are output to a monitor. Hence, when reproduction is performed, a difference between the time codes of the left and right images may be caused. In this case, it is difficult for the user to recognize the difference between the time codes.

In the present disclosure, it is desirable to facilitate recognition of agreement or disagreement between time codes of left and right images.

In the present disclosure, a left image time code is extracted from a left image signal that constitutes a stereoscopic image and a right image time code is extracted from a right image signal that constitutes the stereoscopic image.

The left image time code is compared with the right image time code and a comparison result including information on agreement or disagreement between the left image time code and the right image time code is output.

It is determined that the left image time code and the right image time code are displayed in the same manner when the comparison result indicates agreement between the left image time code and the right image time code. It is determined that the left image time code and the right image time code are displayed in different manners when the comparison result indicates disagreement between the left image time code and the right image time code, and the left image time code and the right image time code are displayed on a display unit.

According to the present disclosure, when time codes of left and right images are in disagreement with each other, the time codes of the left and right images are displayed in different manners on the display unit. This allows the user to easily and visually recognize disagreement between the left image time code and the right image time code.

DETAILED DESCRIPTION OF EMBODIMENTS

Embodiments for implementing the present disclosure (hereinafter referred to as embodiments) will be described below. The description will be made in the following order.
1. First Embodiment (display control of time codes: example of simultaneously displaying time codes of left and right images)
2. Second Embodiment (display control of time codes: example of switching between and displaying time codes of left and right images every frame)
3. Third Embodiment (display control of time codes: example of displaying a difference value between time codes of left and right images)
4. Modifications

1. First Embodiment

Example of Simultaneously Displaying Time Codes of Left and Right Images

A first embodiment of the present disclosure will be described below with reference to FIGS. 1 to 3B. In this embodiment, an example will be described in which the present disclosure is applied to a time code display device 10 that displays time codes of left and right images when displaying the left and right images.

According to the time code display device 10, a computer executes a program to allow internal blocks, which will be described below, to work together so as to implement a time code display method.

Figure 1:
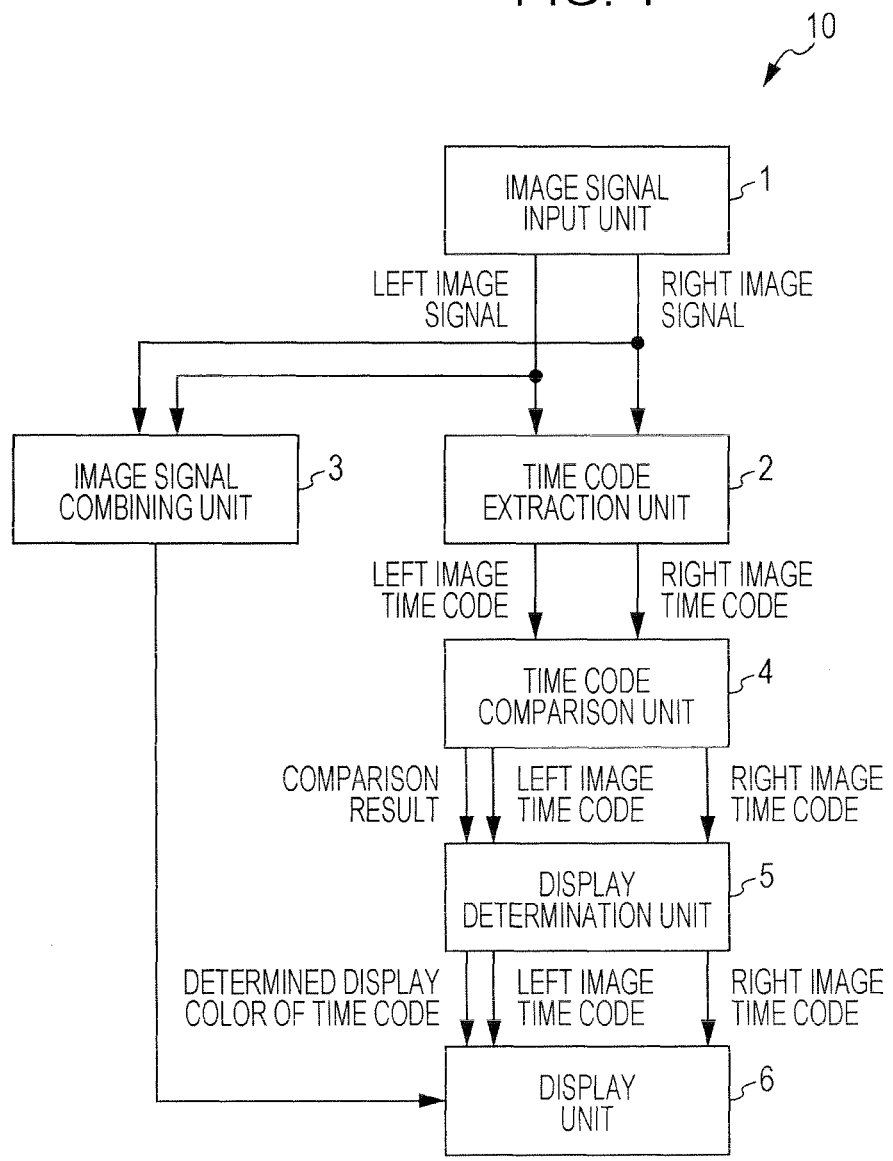
FIG. 1 is a block diagram illustrating an example of the internal structure of a time code display device according to a first embodiment of the present disclosure.

FIG. 1 is a block diagram illustrating an example of the internal structure of the time code display device 10.

The time code display device 10 includes an image signal input unit 1 to which a left image signal and a right image signal are input and a time code extraction unit 2 that extracts time codes of left and right images from the left image signal and the right image signal. The time code display device 10 also includes an image signal combining unit 3 that generates a stereoscopic image by combining the left image signal and the right image signal and a time code comparison unit 4 that compares the time codes of the left and right images extracted by the time code extraction unit 2. In addition, the time code display device 10 includes a display determination unit 5 that determines what color to display the time codes in accordance with agreement or disagreement between the time codes of the left and right images and a display unit 6 that displays the stereoscopic image and the time codes of the left and right images.

The image signal input unit 1 is used as an interface for a network to which a camera system that captures stereoscopic images, a reproducing device that reproduces stereoscopic images, an image database, and the like are connected. Hence, the image signal input unit 1 outputs the left image signal and the right image signal received via the network. The left image signal and the right image signal which are to be input to the image signal input unit 1 are recorded on a recording medium or an imaging device (not illustrated) in, for example, longitudinal time code (LTC) and vertical interval time code (VITC). A time code recorded in the longitudinal direction of a tape is called "LTC" and a time code recorded in a vertical blanking interval of an image signal is called "VITC".

The time code extraction unit 2 extracts a left image time code from a left image signal that constitutes a stereoscopic image and a right image time code from a right image signal that constitutes the stereoscopic image.

The image signal combining unit 3 displays, on the display unit 6, a stereoscopic image generated by combining the left image signal and the right image signal received from the image signal input unit. The display unit 6 alternately displays the left and right images in a time-division manner every frame.

The time code comparison unit 4 compares the time codes of the left and right images and outputs a comparison result including information on agreement or disagreement between the time codes of the left and right images. Here, the time codes of the left and right images each include values of "hour:minute:second:frame". For example, when an image is reproduced at 30 frames/second, the value of the frame increases in the range of "0 to 29" in a cyclic manner.

When the comparison result indicates agreement between the time codes of the left and right images, the display determination unit 5 determines to display the time codes of the left and right images in the same manner. On the other hand, when the comparison result indicates disagreement between the time codes of the left and right images, the display determination unit 5 determines to display the time codes of the left and right images in different manners. Then, on the basis of the determination, the time codes of the left and right images are displayed on the display unit 6. The display unit 6 is a monitor capable of displaying a stereoscopic image or a two-dimensional image and a user may optionally switch the displays.

Figure 2:
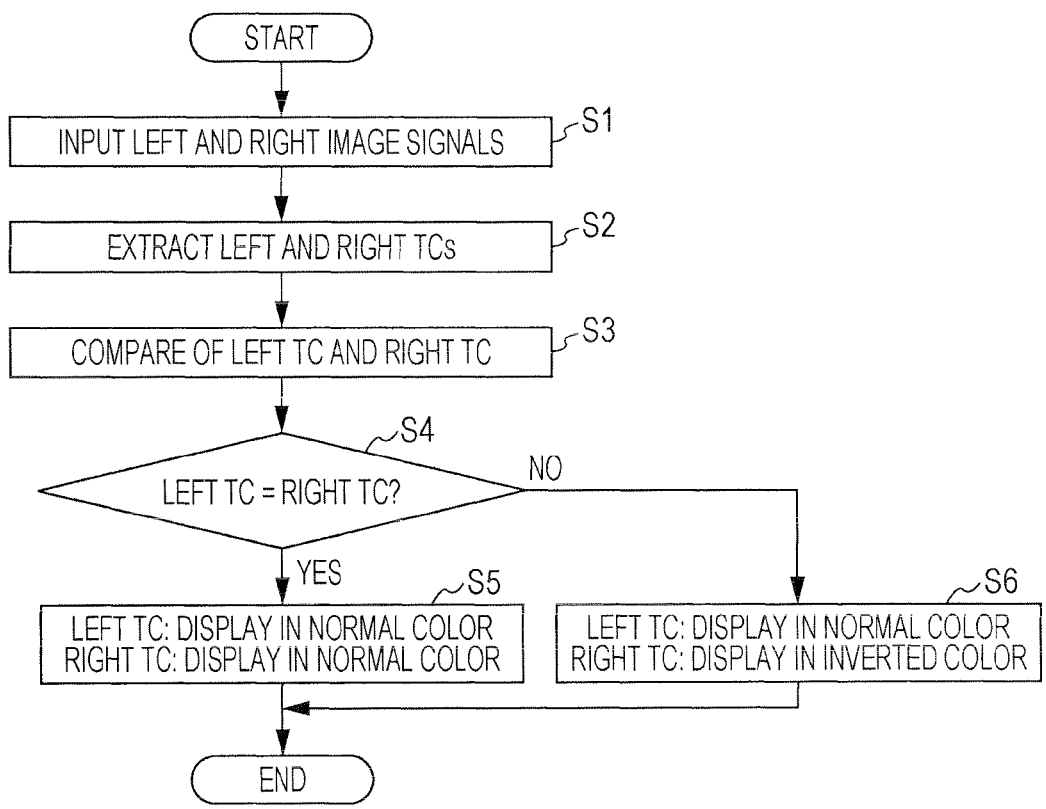
FIG. 2 is a flowchart illustrating an example of a process of the time code display device according to the first embodiment of the present disclosure.

FIG. 2 is a flowchart illustrating an example of a process of the time code display device 10.

First, the time code extraction unit 2 receives a left image signal and a right image signal from the image signal input unit 1 in step S1, and then extracts a left image time code from the left image signal and a right image time code from the right image signal in step S2.

In step S3, the time code comparison unit 4 compares the time codes of the left and right images and outputs a comparison result. In step S4, the display determination unit 5 determines agreement or disagreement between the time codes of the left and right images on the basis of the comparison result.

When the time codes of the left and right images are in agreement with each other, the display determination unit 5 determines to display the time codes of the left and right images in a normal color (e.g., white letters on a black background), and displays both of the time codes in the normal color on the display unit 6 in step S5.

On the other hand, when the time codes of the left and right images are in disagreement with each other, the display determination unit 5 determines to display the left image time code in the normal color and to display the right image time code in an inverted color (e.g., black letters on a white background), and displays the time codes in the respective determined colors on the display unit 6 in step S6. In this embodiment, the left image time code acts as a reference, and when the right image time code differs from the left image time code, the display color of the right image time code is changed.

Figure 3A:
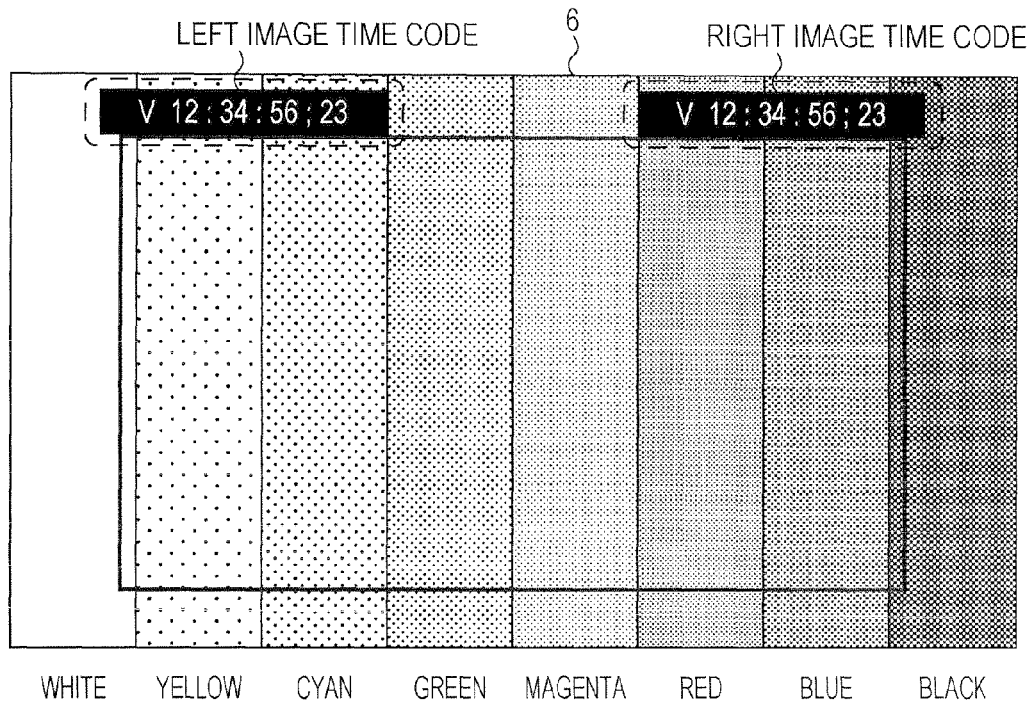
FIGS. 3A and 3B illustrate examples of display on a screen of a display unit according to the first embodiment of the present disclosure.
Figure 3B:
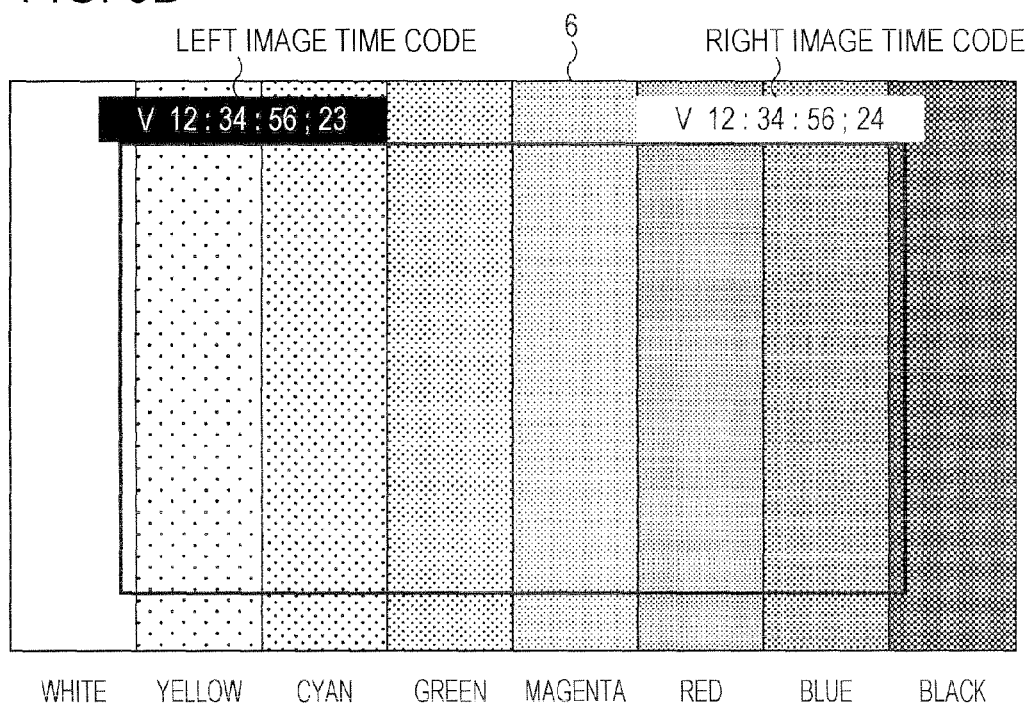

FIGS. 3A and 3B illustrate examples of display on a screen of the display unit 6. FIG. 3A illustrates the example of display for the case where time codes of left and right images are in agreement with each other. FIG. 3B illustrates the example of display for the case where time codes of left and right images are in disagreement with each other.

The display unit 6 displays a color bar indicating colors ranging from white to black, as a test image, and displays the time codes of the left and right images at the top of the screen. Additionally, "V" representing that the time code displayed is in VITC is added to the front of each time code. In a stereoscopic image illustrated in FIG. 3A, the time codes of the left and right images are displayed with white letters on a black background because the time codes are in agreement with each other.

On the other hand, in a stereoscopic image illustrated in FIG. 3B, the time codes of the left and right images are in disagreement with each other in only one frame. The background of the right image time code is white and the letter color of the right image time code is inverted to black. This allows the user to recognize disagreement between the time codes of the left and right images in real time, even when frames only slightly differ from each other.

Here, the time codes of the left and right images are superimposed on the stereoscopic image output from the image signal combining unit 3 and are displayed. This allows the user to visually recognize the time codes of the left and right images simultaneously, even when one of a left-eye shutter and a right-eye shutter of a pair of 3D glasses is closed and the other shutter is open.

According to the above-described time code display device 10 of the first embodiment, when time codes of left and right images are in disagreement with each other, the right image time code is displayed in an inverted manner. This allows the user to quickly and visually recognize disagreement between the time codes of the left and right images.

2. Second Embodiment

Example of Switching Between and Displaying Time Codes of Left and Right Images Every Frame A second embodiment of the present disclosure will be described below with reference to FIGS. 4 and 5B. In this embodiment, an example will be described in which the present disclosure is applied to a time code display device 20 in which a display unit 6 switches between left and right images so as to display a stereoscopic image and alternately displays time codes of the left and right images every frame. In the following description, parts corresponding to those in FIG. 1, which have been already described in the first embodiment, are denoted by the same reference numerals, and description thereof is omitted.

Figure 4:
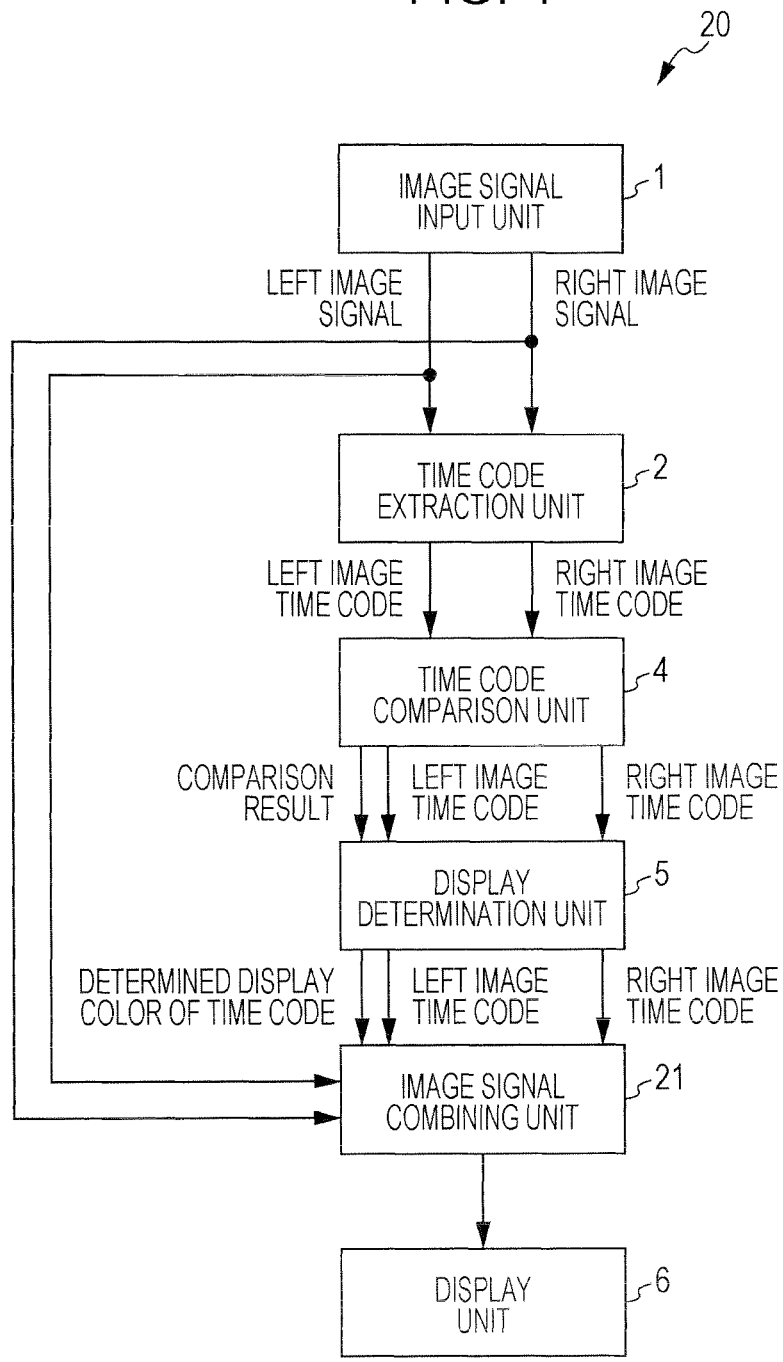
FIG. 4 is a block diagram illustrating an example of the internal structure of a time code display device according to a second embodiment of the present disclosure.

FIG. 4 is a block diagram illustrating an example of the internal structure of the time code display device 20.

The time code display device 20 has the same structure as the above-described time code display device 10 according to the first embodiment, except that an image signal combining unit 21 is arranged downstream of a display determination unit 5.

The image signal combining unit 21 receives a left image signal and a right image signal from an image signal input unit 1, and also receives a left image time code, a right image time code, and information on determined display colors of the time codes from the display determination unit 5. The image signal combining unit 21 superimposes the left image time code on a left image of a stereoscopic image generated by combining the left image signal and the right image signal, superimposes the right image time code on a right image of the stereoscopic image, and then displays the stereoscopic image on the display unit 6.

The display unit 6 switches between and displays the left and right images every frame. Hence, when a left-eye shutter of a pair of 3D glasses that a user wears is open and a right-eye shutter thereof is closed, the user keeps looking at the left image. At this time, on the left image, the left image time code is displayed and the right image time code is not displayed. On the other hand, when the left-eye shutter of the pair of 3D glasses is closed and the right-eye shutter thereof is open, the user keeps looking at the right image. At this time, on the right image, the right image time code is displayed and the left image time code is not displayed.

Figure 5A:
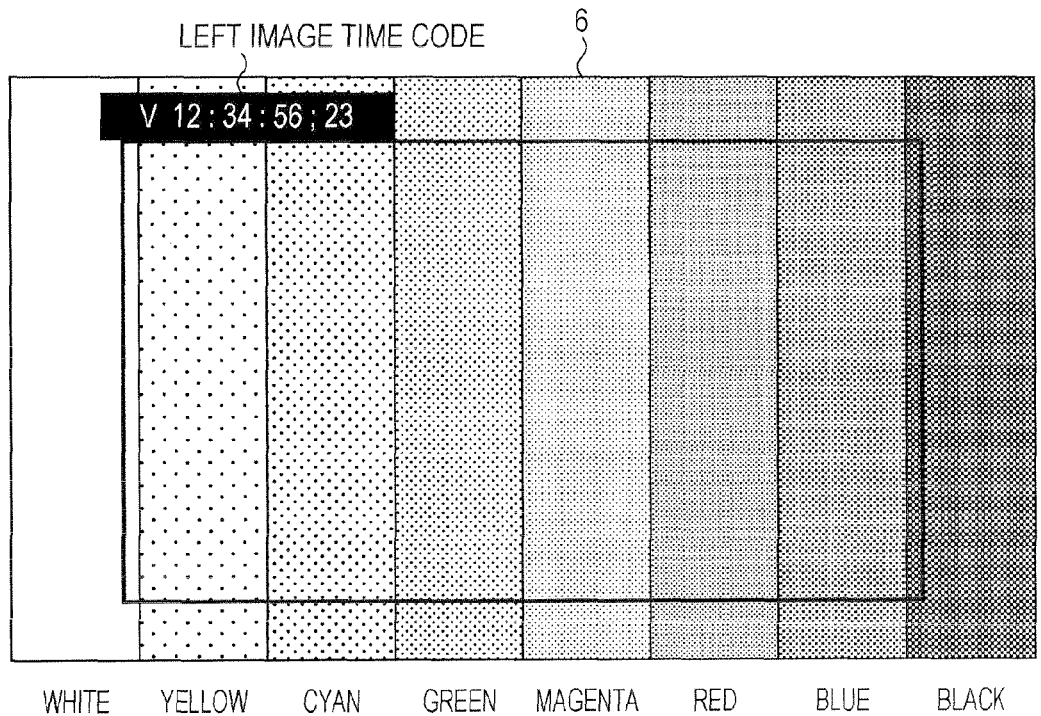
FIGS. 5A and 5B illustrate examples of display on a screen of a display unit according to the second embodiment of the present disclosure.
Figure 5B:
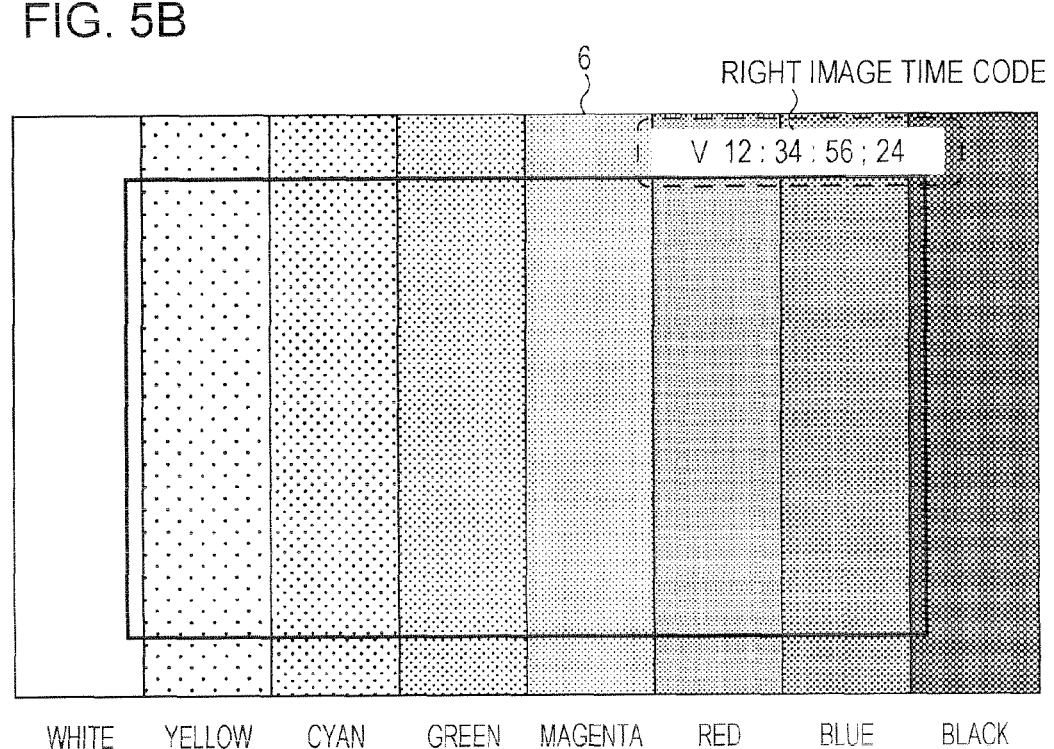

FIGS. 5A and 5B illustrate examples of display on a screen of the display unit 6. FIG. 5A illustrates the example of display for the case where time codes of left and right images are in agreement with each other. FIG. 5B illustrates the example of display for the case where time codes of left and right images are in disagreement with each other.

In a stereoscopic image illustrated in FIG. 5A, the time codes of the left and right images are displayed with white letters on a black background because the time codes are in agreement with each other.

On the other hand, in a stereoscopic image illustrated in FIG. 5B, the time codes of the left and right images are in disagreement with each other in only one frame. The background of the right image time code is white and the letter color of the right image time code is inverted to black. This allows the user to recognize disagreement between the time codes of the left and right images in real time, even when frames only slightly differ from each other.

According to the above-described time code display device 20 of the second embodiment, time codes of left and right images are alternately displayed every frame, and this allows the user to quickly and visually recognize disagreement between the time codes of the left and right images. In addition, when either the left-eye shutter or the right-eye shutter of the pair of 3D glasses is open, the user may keep looking at either the left image or the right image. This allows the user to quickly recognize either the left image or the right image in which disagreement between the time codes has been caused.

Even when the locations of the time codes of the left and right images do not correspond to the left and right of the screen, by keeping one of the shutters of the pair of 3D glasses open, the user may quickly recognize the time code and the image in which a difference has been caused.

3. Third Embodiment

Example of Displaying a Difference Value Between Time Codes of Left and Right Images A third embodiment of the present disclosure will be described below with reference to FIG. 6. In this embodiment, an example will be described in which the present disclosure is applied to a time code display device 30 in which a difference value between time codes of left and right images is displayed on a display unit 6. In the following description, parts corresponding to those in FIG. 1, which have been already described in the first embodiment, are denoted by the same reference numerals, and description thereof is omitted.

Figure 6:
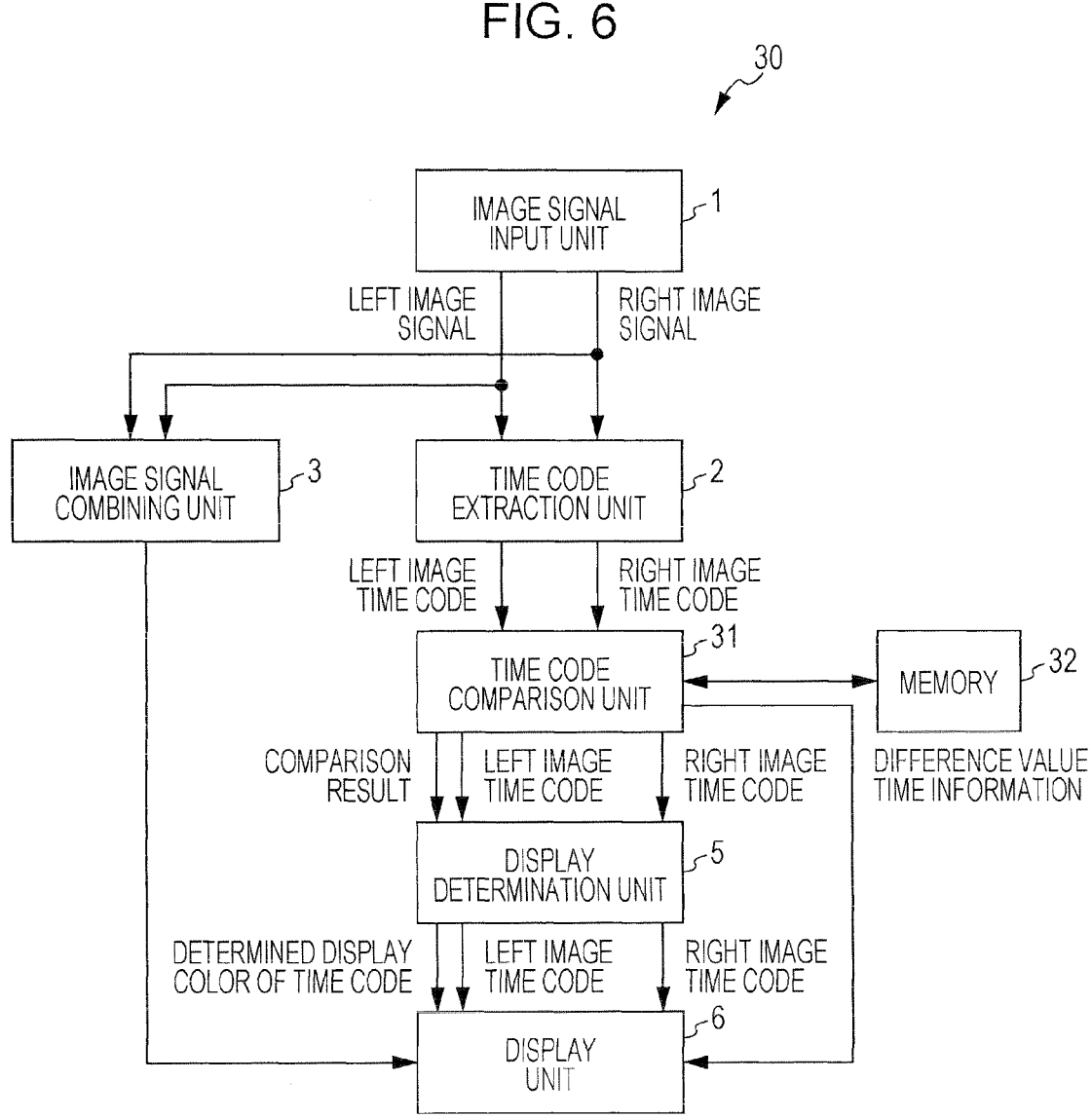
FIG. 6 is a block diagram illustrating an example of the internal structure of a time code display device according to a third embodiment of the present disclosure.

FIG. 6 is a block diagram illustrating an example of the internal structure of the time code display device 30.

The time code display device 30 has the same structure as the above-described time code display device 10 according to the first embodiment, except that it includes a time code comparison unit 31 that displays, on the display unit 6, a difference value between frames indicating an amount of difference between time codes of left and right images.

Because the count of a time code increases at high speed, it is difficult for a user to recognize the location of a frame at the moment at which disagreement between time codes of left and right images occurred. Accordingly, the time code comparison unit 31 displays, on the display unit 6, time information existing at the time when the time codes of the left and right images began to differ from each other, in addition to a difference value between the time codes of the left and right images.

The time code comparison unit 31 writes, on a memory 32, time information existing at the time when the time codes of the left and right images began to differ from each other. Then, the time code comparison unit 31 outputs a comparison result to a display determination unit 5 and also displays, on the display unit 6, a difference value between the time codes of the left and right images and the time information read out from the memory 32.

According to the above-described time code display device 30 of the third embodiment, a difference value is displayed on the display unit 6 at the time when time codes of left and right images began to differ from each other. This allows the user to quickly recognize a difference value indicating the difference between the time codes of the left and right images.

Additionally, in the time code display device 30, time information existing at the time when the time codes of the left and right images began to differ from each other is displayed on the display unit 6. This allows the user to easily recognize when the time codes of the left and right images began to differ from each other.

In the time code display device 30, a difference value and time information may be simultaneously displayed on the display unit 6, or only one of them may be displayed thereon. This display may optionally be set by the user. After the time codes of the left and right images differ from each other, when the time codes agree with each other again, time information including a time when the time codes began to differ from each other and a time when the time codes agreed with each other may be displayed.

4. Modifications

In some cases, one of time codes is not added to image signals of left and right images input to the above-described time code display devices according to the first to third embodiments. In this case, in order to indicate to the user that the time code has not been added, the image signal to which the time code has not been added is continuously displayed in an inverted manner. For example, in a section in which the time code would have been displayed, hyphens, like "--:--:--:--", may be displayed.

When one of time codes differs from the other time code which is a reference, the time code may be, for example, displayed in red or the like, blinked, highlighted in bold type or the like, or hidden instead of being displayed in an inverted manner. The time code to be displayed in an inverted manner may be either of the time codes and may optionally be set by the user.

Time codes of left and right images which have been made to differ from each other by a certain amount beforehand may be input to the image signal input unit 1. In this case, a certain amount of difference may be set beforehand. When the difference between the time codes of the left and right images is maintained at the certain amount, the time codes may be displayed in the normal color. When the difference exceeds or differs from the certain amount, one of the time codes may be displayed in an inverted manner.

When it is not necessary to precisely regulate the difference between time codes of left and right images in units of frames, for example, when a difference on the order of seconds is permitted, the difference may be set as a permissible range in which the time codes of the left and right images are presumed to be in agreement with each other. Such a permissible range may optionally be set by the user.

Disagreement between time codes of left and right images may be indicated to the user by a sound, display of an icon, etc. Although the time codes each include values of "hour:minute:second:frame", the time code may include only "hour:minute:second", or a value of a field may be used in place of the value of a frame. As an example of the frame rate, "30 frames/second" is used; however, "60 frames/second" or other values may be used.

The display unit 6 may be used as a monitor that does not display left and right images in a time-division manner, but displays left and right images for every line of the display screen. At this time, the user may view a stereoscopic image with a pair of polarized glasses or the like having left and right lenses that employ a polarizing plate. One of the left and right images may be viewed by controlling change in polarization produced by one of the lenses.

When a series of processes in the above-described embodiments is performed by software, it may be performed by a computer in which a program included in the software has been incorporated into specialized hardware, or a computer into which a program for performing various functions has been installed. For example, a program included in desired software may be installed into a general-purpose personal computer or the like and be executed.

A recording medium on which program code of software for implementing the functions in the above-described embodiments has been recorded may be supplied to a system or device. It goes without saying that a computer of the system or device, (or a control device, such as a central processing unit (CPU)) reads out and executes the program code stored on the recording medium and thereby the functions may be implemented.

Examples of the recording medium for supplying the program code include a flexible disk, a hard disk, an optical disc, a magnetic optical disk, a compact disc read only memory (CD-ROM), a compact disc-recordable (CD-R), a magnetic tape, a non-volatile memory card, and a read only memory (ROM).

The functions in the above-described embodiments are implemented by executing the program code that the computer has read out. In addition, on the basis of the instruction of the program code, an operating system (OS) and so forth that are operating on the computer perform part or all of the actual processes. The case where the functions in the above-described embodiments are implemented by the processes is also included. In this way, the series of processes may be performed by not only hardware but also software.

The present disclosure is not limited to the above-described embodiments and other various applications and modifications may be made without departing from the gist of the present disclosure described in the appended claims.

The present disclosure may have the following structures.

(1) A time code display device including:

a time code extraction unit that extracts a left image time code from a left image signal that constitutes a stereoscopic image and a right image time code from a right image signal that constitutes the stereoscopic image;

a time code comparison unit that compares the left image time code with the right image time code and outputs a comparison result including information on agreement or disagreement between the left image time code and the right image time code; and a display determination unit that determines to display the left image time code and the right image time code in the same manner when the comparison result indicates agreement between the left image time code and the right image time code, determines to display the left image time code and the right image time code in different manners when the comparison result indicates disagreement between the left image time code and the right image time code, and displays the left image time code and the right image time code on a display unit.

(2) The time code display device according to item (1), further including:

an image signal combining unit that displays, on the display unit, the stereoscopic image generated by combining the left image signal and the right image signal, wherein the left image time code and the right image time code are superimposed on the stereoscopic image and are displayed on the display unit.

(3) The time code display device according to item (1), further including:

an image signal combining unit that superimposes the left image time code on a left image of the stereoscopic image, superimposes the right image time code on a right image of the stereoscopic image, and displays the stereoscopic image on the display unit.

(4) The time code display device according to any one of items (1) to (3), wherein the time code comparison unit displays, on the display unit, a difference value between the left image time code and the right image time code.

(5) The time code display device according to any one of items (1) to (4), wherein, when the display determination unit determines to display the left image time code and the right image time code in different manners, the display determination unit changes display color of, blinks, highlights, or hides one the left image time code and the right image time code.

(6) A time code display method including:

extracting a left image time code from a left image signal that constitutes a stereoscopic image and a right image time code from a right image signal that constitutes the stereoscopic image;

comparing the left image time code with the right image time code and outputting a comparison result including information on agreement or disagreement between the left image time code and the right image time code; and determining to display the left image time code and the right image time code in the same manner when the comparison result indicates agreement between the left image time code and the right image time code, determining to display the left image time code and the right image time code in different manners when the comparison result indicates disagreement between the left image time code and the right image time code, and displaying the left image time code and the right image time code on a display unit.

The present disclosure contains subject matter related to that disclosed in Japanese Priority Patent Application JP 2011-281056 filed in the Japan Patent Office on Dec. 22, 2011, the entire contents of which are hereby incorporated by reference.

What is claimed is:

1. A time code display device comprising:

a time code extraction unit that receives a stereoscopic image comprised of left image signals including a left image time code and right image signals including a right image time code, and extracts the left image time code from the left image signal and the right image time code from the right image signal;

a time code comparison unit that compares the left image time code with the right image time code and outputs a comparison result indicating whether the left image time code and the right image time code are substantially equal; and a display determination unit that causes a display unit to display the left image time code superimposed on a left image corresponding to the left image signals and the right image time code superimposed on a right image corresponding to the right image signals, the left image time code and the right image time code being displayed concurrently with equal display characteristics when the comparison result indicates the left image time code and the right image time code are substantially equal, and the left image time code and the right image time code being displayed with unequal display characteristics such that the display determination unit changes display color, blinks, highlights, or hides one of the left image time code and the right image time code when the comparison result indicates the left image time code and the right image time code are not substantially equal.

2. The time code display device according to claim 1, further comprising:

an image signal combining unit that displays, on the display unit, the stereoscopic image generated by combining the left image signal and the right image signal.

3. The time code display device according to claim 1, further comprising:

an image signal combining unit that superimposes the left image time code on a left image of the stereoscopic image, superimposes the right image time code on a right image of the stereoscopic image, and displays the stereoscopic image on the display unit.

4. The time code display device according to claim 2, wherein the time code comparison unit displays, on the display unit, a difference value between the left image time code and the right image time code.

5. A time code display method comprising:

extracting a left image time code from a left image signal that constitutes a stereoscopic image and a right image time code from a right image signal that constitutes the stereoscopic image;

comparing the left image time code with the right image time code and outputting a comparison result indicating whether the left image time code and the right image time code are substantially equal; and causing a display unit to display the left image time code superimposed on a left image corresponding to the left image signals and the right image time code superimposed on a right image corresponding to the right image signals, the left image time code and the right image time code being displayed concurrently with equal display characteristics when the comparison result indicates the left image time code and the right image time code are substantially equal, and the left image time code and the right image time code being displayed with unequal display characteristics such that the display of one of the left image time code and the right image time code is of a different color, or blinks, or is highlighted, or is hidden when the comparison result indicates the left image time code and the right image time code are not substantially equal.

* * * * *